United States Patent Office 3,475,287
Patented Oct. 28, 1969

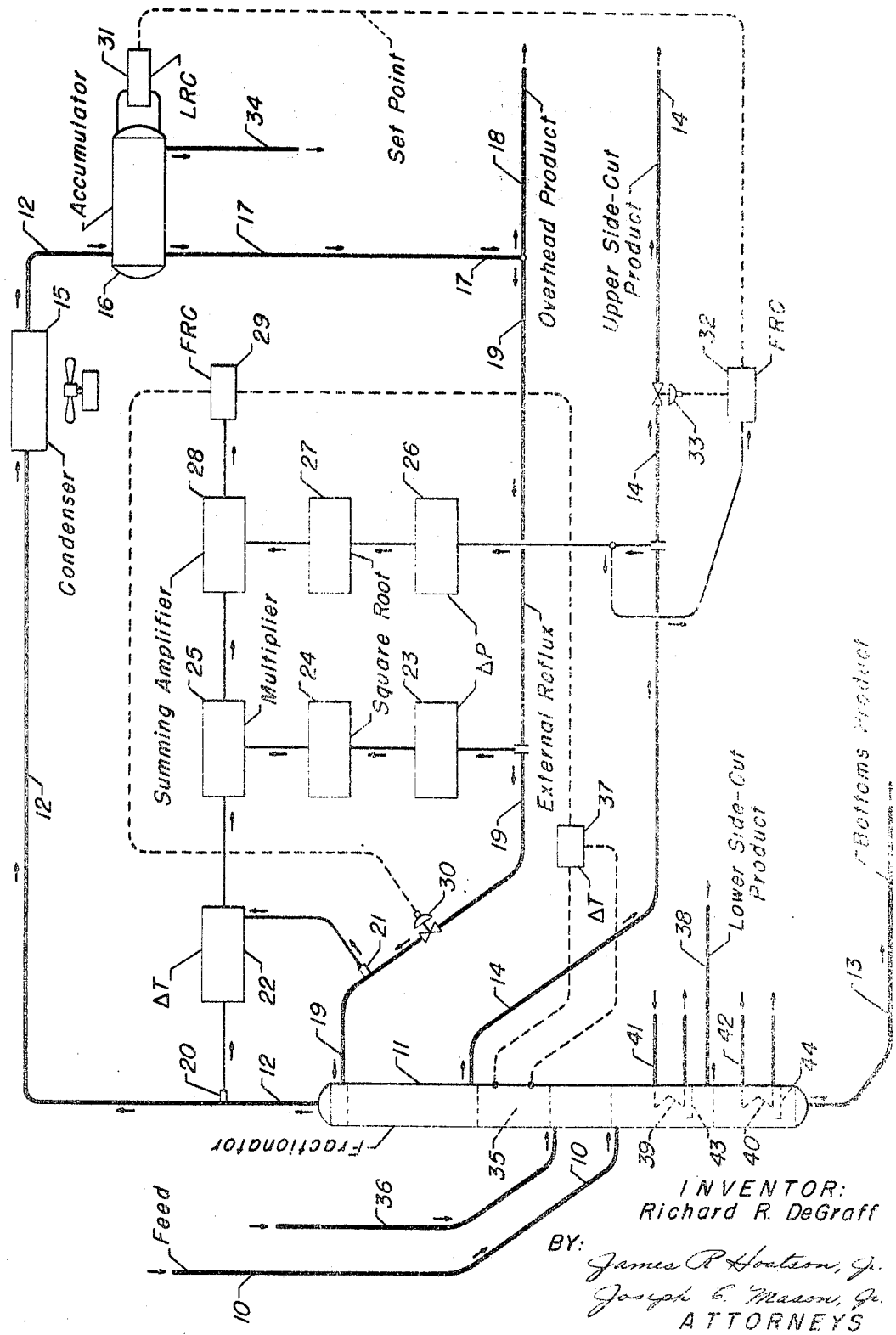

3,475,287
FRACTIONAL DISTILLATION SYSTEM WITH PLURAL FEEDS, REBOILERS AND SIDE STREAMS HAVING INTERNAL REFLUX CONTROLS
Richard R. De Graff, Arlington Heights, Ill., assignor to Universal Oil Products Company, Des Plaines, Ill., a corporation of Delaware
Filed May 16, 1968, Ser. No. 729,720
Int. Cl. B01d 3/42
U.S. Cl. 202—155                                    3 Claims

ABSTRACT OF THE DISCLOSURE

System for fractional distillation including a distillation column containing a multiplicity of product withdrawal means, a multiplicity of internal reboiler means and internal reflux control means responsive to at least one withdrawal means.

BACKGROUND OF THE INVENTION

This invention relates to a system for fractional distillation. It particularly relates to an improved system for controlling a distillation column having more than one feed inlet means, more than one product withdrawal means, and more than one heat supplying means. It specifically relates to a system for the simultaneous fractionation of feed for a reaction zone and an effluent from a reaction zone.

It is well known in the prior art to separate fluid mixtures into individual component fractions according to boiling point differences utilizing fractionation means. The typical prior art fractionation column contains a number of contact devices, such as perforated plates, bubble cap plates, ceramic packing, and the like, in order to effectuate vapor-liquid contact so that effective separation of the components could be achieved. Usually, the fluid mixture to be separated is introduced into the column and heat is supplied to the bottom of the column, usually by conventional reboiler means either external or internal to the column, in order to vaporize the liquid components present in the feed mixture. Thus, the lowest boiling constituents are obtained as an overhead product and the heaviest boiling constituents are obtained as a bottoms or residue product.

In some cases, the prior art distillation columns include the withdrawal of one or more side-cut product fractions having boiling points intermediate to the overhead and bottoms fraction. It is also conventional to return a portion of the condensed overhead material to the column as external reflux. The chemical engineering tool of distillation is well known and is used extensively in the petroleum and chemical industries to separate fluid mixtures.

Even though the principle of distillation is relatively simple and well understood, the operation of a distillation column is actually frought with difficulty. For example, the column must be properly sized in order to provide space enough for contact between the various liquid and vapor streams within the column before effective separation can take place. Since commercial fractionation columns are generally large pieces of equipment, there is inherent in the operation of such columns a considerable time lag between changes in operating conditions and a noticeable change in the result from such changed conditions. In other words, if there is a change in the feed temperature, there is a considerable time lag involved before the effect of such change can be detected in a corresponding change in the composition of one or more product streams. Once the composition change has been detected, a corresponding counter-change is made in the flow rate of such stream in order to compensate for the change in feed temperature. This continuing cause and effect results in a rather unstable operation of the fractionating column and has prompted those skilled in the art to maintain distillation operations as simple as possible and to devise numerous control techniques for minimizing the instability of such columns.

In the petroleum and chemical industries the art of distillation is extensively used to recover various components of a multi-component mixture. Heretofore, the prior art has fairly consistently utilized single fractionation columns to separate two components out of a multi-component mixture in a plurality or "train" of fractionation columns so that simplicity may be maintained in each individual fractionation column.

However, in order for economy of operation and of capital investment to be realized to a greater extent, there is a need for a system which can combine a multitude of fractionation problems into a single unit in a facile and economical manner.

SUMMARY OF THE INVENTION

Therefore, it is an object of this invention to provide a system for fractional distillation.

It is another object of this invention to provide a system for distilling a multiplicity of feed streams utilizing a multiplicity of withdrawal means, a multiplicity of specific reboiler means, and effective internal reflux control means responsive to at least one withdrawal means.

It is a specific object of this invention to provide a system for fractional distillation which is used to economic advantage in a method for producing benzene via the catalytic hydrodealkylation of toluene.

Accordingly, the present invention provides a system for fractional distillation which comprises: (a) an elongated vertically disposed column having a plurality of vertically spaced vapor-liquid contact means positioned internally throughout a major portion of the height of the column; (b) first feed inlet means at a locus intermediate the ends of said column and second feed inlet means spaced from and above said first inlet means; (c) first vapor outlet means from the upper portion of said column, second outlet means from the side of said column at a locus spaced from and above said second feed inlet means and having first flow measurement means associated therewith, third outlet means from the side of said column at a hereinafter specified locus spaced from and below said feed inlet means, reflux inlet means into the top portion of the column having second flow measurement means associated therewith, and a liquid bottoms outlet means from the bottom portion of the column; (d) first heat supplying means comprising reboiler means in the lower portion of said column at a locus below said third outlet means, and second heat supplying means comprising reboiler means in the lower portion of said column at a locus spaced above said third outlet means and spaced below said first feed inlet means; and (e) internal reflux rate control means in the upper portion of said column operatively responsive to said first flow measurement means.

Another embodiment of this invention includes the system hereinabove wherein said second flow measurement means is operatively responsive to differential temperature measurement means within the said column at a locus intermediate said second feed inlet means and said reflux inlet means.

Therefore, it can be seen from the above embodiments that the present invention embodies generally a system for fractional distillation which includes a distillation column containing a multiplicity of feed inlet points, a multiplicity of product withdrawal means, a multiplicity of reboiler means, and internal reflux control means responsive to at least one withdrawal means.

DETAILED DESCRIPTION OF THE INVENTION

In recent years, the use of aromatic hydrocarbons, such as benzene, has greatly increased. For example, benzene of a high grade purity is used as an intermediate in the preparation of styrene monomer which may be polymerized to form a type of rubber. Also, benzene is used as an intermediate in the preparation of phenol, aniline, maleic anhydride, insecticides such as DDT and benzene hexachloride, and as intermediates in the preparation of synthetic fibers, such as some types of nylon.

The dealkylation of alkylaromatic hydrocarbons, such as toluene to produce benzene, is generally well known in the prior art and may be performed either thermally or catalytically. The reaction is exothermic in nature and must be carefully controlled in order to prevent a "runaway" reaction, i.e., the reaction temperature increases beyond acceptable and desirable limits. Additionally, the most efficient dealkylation reaction to produce, for example, benzene would be to supply, as feed, relatively high purity toluene so that a minimum of side-products, such as gaseous hydrocarbons and polymers, will be formed. However, in commercial practice high purity toluene can only be obtained from a conversion operation having associated therewith a relatively expensive solvent extraction step which separates the toluene from the other $C_8$ aromatic hydrocarbons produced in, for example, a catalytic reforming step utilizing platinum catalyst. Alternatively, toluene may be obtained in substantially impure form as a by-product from the coke oven operation.

Accordingly, the present invention embodies a fractionation system which is operated as part of a method for producing benzene via dealkylation of toluene which utilizes a relatively impure toluene as feedstock to the system.

In brief, therefore, the present inventive system provides an improvement over the prior art procedures in accomplishing the simultaneous separation of the effluent from the hydrodealkylation reaction zone and a relatively impure toluene-containing feed stream utilizing a single fractionation system. By operating the system specified, a relatively impure toluene-containing feed stream may be processed through the system in such a manner that the actual feed to the dealkylation reaction zone is relatively pure thereby providing economy of operation and economy of capital investment in terms of reactor size, pump size, fractionating column size, etc. It should be noted that the single fractionation system is operated by having at least two internal reboiler means. The benefits to be gained from the practice and utilization of the present system reside in the use of this dual reboiler system and the withdrawal of the relatively pure toluene stream from a location within the fractionation zone between the two reboiler means.

As will become more evident from the description presented hereinbelow, according to a preferred embodiment of the present invention, the upper reboiler means is internally located and utilizes relatively low pressure steam as the external heating media while the lower reboiler is also internal and uses relatively high pressure steam as the heating media.

The dealkylation reaction conditions and the art of dealkylation are well known to those skilled in the art and need not be presented with great detail herein. However, suitable dealkylation conditions for the production of benzene from toluene utilizes a well known catalytic composite such as catalyst comprising a soluble salt of a metal of Group IV of the Periodic Table supported on an alumina base and also includes a temperature from 1,000° F. to 1,500° F., a pressure from 300 p.s.i.g. to 1,000 p.s.i.g., and, desirably, a molar excess of hydrogen in order to reduce the possibility of catalyst deactivation due to deposition of coke or other heavy carbonaceous material upon the catalytically active centers and surfaces of the catalyst. The liquid hourly space velocity through the catalyst bed may range from 0.5 to 5 and the hydrogen to hydrocarbon mol ratio may range from 3:1 to 15:1. As previously mentioned, the dealkylation reaction may also be performed thermally, e.g. in the substantial absence of any catalyst.

Illustrative of the system of the present invention is a single distillation column having a feed inlet for the dealkylated product stream, a feed inlet for the relatively impure toluene stream, a side-cut stream for withdrawing a high purity benzene, a side-cut stream for withdrawing a relatively high purity toluene, and an external reflux stream which is controlled in a unique manner in order to maintain the internal reflux in the column at a predetermined level responsive to the rate of withdrawal of the side-cut stream of benzene. In order to supply heat to this complicated fractionation system, the present invention embodies the distinctive feature of having two reboiler means located, preferably, internally within the fractionation zone. It is not intended to limit the present invention to the use of any predetermined numbers or levels of reboilers in as much as one, two, or more reboilers may be used in the column. Also, external reboilers may be used in combination with or instead of the internal reboilers where desired within the scope of this invention. In addition, various forms or designs of liquid wells to accommodate the internal reboiler means may be utilized as well as proper weir means to effect a liquid overflow from each zone containing a reboiler and a substantially constant liquid level in such zone to permit uniform heating of the reboiler tubes.

As used herein, the term "internal reflux" is intended to include the amount of external reflux returned to the column plus the amount of vapor which is condensed near the top of the column by supercooled external reflux. Those skilled in the art know well that if the internal reflux is maintained constant at the top of the fractionating column above the feed inlets according to this definition, then, the internal reflux step by step down the column will similarly be maintained constant, assuming constant molal overflow. It is important to note that the area of actual control within the fractionating column contemplated by the system of the present invention is that area between the uppermost feed introduction point and, preferably, the upper side draw-off point in question.

Thus, it can be seen that the present invention provides a system whereby a change in the withdrawal rate of the upper side-cut product, e.g. benzene, results in an immediate change in the rate of external reflux added so that the internal reflux within the column is thereby maintained constant at a predetermined flow regardless of changes in the side-cut, e.g. benzene product withdrawal rate. In short, therefore, the practice of the present invention provides stability of operation not readily achievable by the control schemes of the prior art.

Referring to the inventive concept of having at least two internally placed reboiler means, certain savings in material costs result from this positioning of a reboiler directly within a column since there is elimination of a shell and fluid process piping otherwise required to connect the reboiler to the column. The elimination of external reboilers also can greatly reduce the plot area which may be required for a fractionator, particularly in areas where units are placed in crowded juxtaposition to other processing units.

It should also be noted that substantial operational economy may be achieved from the utilization of the present system whereby relatively high temperature fractionation and stripping operations can be performed with relatively high pressure steam, such as 450 to 600 pounds steam, supplied illustratively to the lower level reboilers and relatively low pressure steam, such as 25 to 100 p.s.i.g. steam, is supplied to the upper level internal reboiler means. It is not intended, however, to limit the present inventive system to the use of only steam for providing heat to the internal reboilers. It is within the concept of the present invention to use any external heat exchange medium which can supply heat to the internally placed reboiler means.

To illustrate the improved utility of utilizing the dual and internally spaced reboiler means, if a fractionating column having a temperature of the order of 375° F. to 385° F. is supplied with heat from 450 pound steam at the lower portion of the column and 25 pound steam is utilized to maintain a temperature of about 200° F. at a level above the lower reboiler means, it can be seen that the lower reboiler heat may provide latent heat in the order of 80 to 90 b.t.u.'s per pound and the upper reboiler means may provide latent heat in the order of 120 b.t.u.'s per pound. It is thus seen that more latent heat is obtained from the elevated internal reboilers and a more efficient heat input from the column from the dual level arrangement.

By way of comparison, it was found that a column to perform essentially the same service according to the prior art schemes of having only one reboiler in the lower portion of the column would generally have to be of greater diameter by, for example, one (1) foot or more. Accordingly, economy in capital investment is readily achieved by utilizing the two level reboiler arrangement as taught by the present system.

The invention may be more fully understood with reference to the appended drawing which is a schematic representation of apparatus for practicing one embodiment of the present invention.

DESCRIPTION OF THE DRAWING

It is understood that the drawing as well as the description thereof is presented herein for the sole purpose of illustration and is not intended to limit the system of the present invention beyond the scope of the appended claims. In the interest of simplicity, various heat exchangers, condensers, valves, control instruments, vessel configurations, etc. have been eliminated from the drawing leaving only those vessels, connecting lines, and block representations which are necessary for a complete understanding of the system.

Referring now to the drawing, a relatively impure toluene stream contaminated with aromatic hydrocarbons and obtained as a by-product oil from a coke oven operation or from a catalytic reforming is introduced into the system via line 10 and passed into fractionation column 11 at a locus intermediate the ends of the column. A typical toluene-containing stream may comprise on a commercial scale 154 mols per hour of toluene, 48 mols per hour of benzene, and 12 mols per hour of xylene. This stream enters fractionator 11 at a temperature of about 250° F. and a pressure of about 9 p.s.i.g.

A hereinafter described benzene-containing stream comprising the hydrocarbon effluent from the toluene dealkylation reaction zone is also introduced into fractionator 11 via line 36 at a locus above said feed locus for line 10. This benzene-containing stream on a commercial scale may comprise 159 mols per hour of benzene, 70 mols per hour of toluene, 1.2 mols per hour of xylene, 2.9 mols per hour of $C_{12}H_{10}$ (diphenyl), 3.2 mols per hour of $C_{10}H_8$ (naphthalene), and 3.8 mols per hour of $C_{14}H_{10}$ (anthracene), and enters fractionator 11 at a temperature of about 220° F. and a pressure of about 8 p.s.i.g.

Suitable fractionation conditions are maintained in fractionator 11 whereby a light hydrocarbon stream comprising, for example, cyclohexane, is withdrawn as an overhead vapor fraction via line 12 at a temperature of about 195° F. and a pressure of about 5 p.s.i.g An upper side-cut fraction comprising high purity benzene is withdrawn via line 14 at a temperature of about 195° F. and a pressure of about 5 p.s.i.g. Typically, this upper side-cut stream will comprise about 207 mols per hour of 5° C. freeze point benzene.

A lower side-cut product stream comprising relatively pure toluene is withdrawn via line 38 at a temperature of about 275° F. and a pressure of about 12 p.s.i.g. This lower side-cut stream on a commercial scale may comprise 223 mols per hour of toluene, 14 mols per hour of xylene, 2.8 mols per hour of $C_{12}H_{10}$, 3 mols per hour of $C_{10}H_8$, and 3.6 mols per hour of $C_{14}H_{10}$. It should be noted at this point that the material in line 38 comprises about 90% on a mol basis toluene whereas the feed material entering via line 10 comprised only about 72% toluene on a mol basis.

A bottoms stream comprising relatively heavy hydrocarbons (e.g. dicyclic aromatic hydrocarbons) is withdrawn from fractionator 11 via line 13 at a temperature of about 405° F. and a pressure of about 12 p.s.i.g. As necessary or desirable, a portion of the material in line 13 may be passed by means not shown back into fractionator column 11 for further handling as more fully described hereinbelow.

In accordance with an essential feature of the inventive system, fractionator 11 contains at least two reboiler means, 39 and 40, respectively, preferably, internally located. Reboiler means 39 is heated by relatively low pressure steam (e.g. 150 p.s.i.g.) which passes through reboiler 39 via lines 41. Suitable well means 43 having associated therewith a weir is also utilized in the column in order to maintain a liquid seal over the tubes of reboiler 39.

Similarly, reboiler 40 is heated by relatively high pressure steam (e.g. 600 p.s.i.g.) which passes through reboiler 40 via lines 42. Well 44 having associated therewith suitable weir means is also a desirable part of fractionator 11 in order to maintain a liquid seal over the tubes of lower reboiler means 40.

As previously mentioned and distinctly preferred, a cycle of the relatively heavy aromatic hydrocarbons from line 13 is continuously returned to the fractionating column in such a manner as to maintain a liquid seal over the tubes of lower reboiler means 40.

It is also to be noted from the embodiments of the present invention, previously described, that the withdrawal of the lower side-cut product stream comprising a toluene concentrate via line 38 is at a locus between internal reboiler means 39 and 40. By operating in this manner, the relatively heavy aromatic hydrocarbons are rejected from the bottom of the column via line 13 and any toluene constituents therein are stripped out by the added heat which is introduced into the column via internal reboiler 40. Similarly, any benzene which has passed down the column into the vapor-liquid contacting means or trays normally associated with fractionating columns, is also stripped out by the use of heat which is introduced into the column at an upper level via internal reboiler 39.

Returning now to the internal reflux control feature of the present invention, it is to be noted that the inventive system requires that at least one side-cut product stream be withdrawn from an upper portion of the column via line 14; such location being at the top of the area wherein it is desired to maintain the internal reflux constant, to wit: the area shown as 35. The overhead vapors from the column in line 12 are condensed in fan cooler or water condenser 15 and the resulting liquid therefrom is accumulated in vessel 16. The condensate is removed via line 17 and at least a portion of this condensate is returned via line 19 to column 11 as external reflux. A net overhead product stream comprising, for example, the previously mentioned relatively light hydrocarbons may be withdrawn from the system via line 18. In some cases, a contaminant product, such as water, may be withdrawn from accumulator 16 via line 34.

The amount of condensate in accumulator 16 is measured by level recorder controller 31 which activates control valve 33 via flow recorder controller 32 to maintain and control the rate of withdrawal of the upper side-cut product stream in line 14.

The calculation of internal reflux at the top of the column, which if maintained constant will also render the internal reflux within the area 35 constant, is calculated by the well known heat and material balances across a given section of the column; in this instance the top tray of fractionator 11. Therefore, the material balance at the top of the fractionator can be expressed:

$$R_e + V_i = R_i + V_o \tag{1}$$

where:

$R_e$ = mass flow of liquid entering top tray (external reflux)
$V_i$ = mass flow of vapor entering top tray
$R_i$ = mass flow of liquid leaving top tray (internal reflux)
$V_o$ = mass flow of vapor leaving top tray.

The heat balance at the top tray can be expressed:

$$R_e h_e + V_i H = R_i h_i + V_o H \tag{2}$$

where:

$h_e$ = enthalpy of external reflux
$h_i$ = enthalpy of internal reflux
$H$ = enthalpy of vapor streams (assumed to be equal).

The enthalpy of the vapor streams entering and leaving the top tray can be expressed:

$$H = h_i + \lambda \tag{3}$$

where $\lambda$ is the heat of vaporization of liquid on the tray.
The enthalpy of the external reflux can be expressed:

$$h_e = h_i - C_p \Delta T \tag{4}$$

where:

$C_p$ = specific heat of the external reflux stream
$\Delta T$ = the difference in temperature between the top tray and external reflux.

Equation 3 can be substituted into Equation 2 to eliminate H and rewritten:

$$V_i(h_i + \lambda) - V_o(h_i + \lambda) = R_i h_i - R_e h_p \tag{5}$$

Equation 4 can be substituted into Equation 5 to eliminate $h_e$ and rewritten:

$$(h_i + \lambda)(V_i - V_o) = h_i(R_i - R_e) + R_e C_p \Delta T \tag{6}$$

From Equation 1 it is known:

$$V_i - V_o = R_i - R_e \tag{7}$$

Equation 7 can be substituted into Equation 6 and reduced to obtain:

$$R_i = R_e \left(1 + \frac{C_p \Delta T}{\lambda}\right) \tag{8}$$

Equation 8 can be modified by substituting a constant K for:

$$C_p/\lambda$$

and substituting in Equation 8 to obtain:

$$R_i = R_e(1 + K\Delta T) \tag{9}$$

In order to solve Equation 9 a differential pressure transmitter 23 is connected across an orifice in conduit 19 to establish a signal which is representative of the differential pressure across the orifice. This signal is applied to the input of a means 24 for establishing an output signal representative of the square root of the input signal. The output signal of means 24 which is thus representative of the flow $R_e$ through conduit 19 is applied to the first input of a multiplier 25. A first thermocouple 21 is disposed in conduit 19 and a second thermocouple 20 is disposed in conduit 12. These two thermocouples are connected to the input of a transducer which establishes a signal representative of the difference between the two temperatures sensed by the two thermocouples. As previously mentioned, since K is a constant, means 22 now calculates the term "$(1 + K\Delta T)$" and develops an output signal therefrom. This signal is applied to the second input of multiplier 25. This output signal from multiplier 25 is thus equal to the term "$R_i$" of Equation 9.

However, as previously mentioned, a side-cut product fraction is being withdrawn via line 14 in accordance with the control demands of LRC 31. Accordingly, the rate of side-cut product withdrawal, $R_s$, must be taken into account. A differential pressure transmitter 26 is connected across an orifice in line 14 to establish a signal which is representative of the differential pressure across the orifice. This signal is supplied to the input means 27 for establishing an output signal representative of the square root of the input signal. The output signal of means 27 which is thus representative of the flow $R_s$ through conduit 14 is applied to the first input of a summing amplifier 28. As previously mentioned, the output signal from multiplier 25 is now applied to the second input of summing amplifier 28. The calculations performed by amplifier 28 results in the subtraction of the quantity $R_s$ from the quantity represented by the signal from multiplier 25, thereby establishing a signal from amplifier 28 representing the solution to the following equation:

$$R_{i_L} = R_e(1 + K\Delta T) - R_s \tag{10}$$

wherein $R_{i_L}$ is the internal reflux in area 35.

The solution to Equation 10 represents a signal which provides input to flow recorder controller 29 which in turn activates control 30 for adjusting the rate of external reflux flowing in conduit 19.

In actual operation, therefore, if the rate of withdrawal of side-cut product in line 14 increases, appropriate calculations will be made so that there will be a corresponding immediate increase in the amount of external reflux added to the column via line 19. Conversely, if the rate of side-cut product withdrawal is decreased there will be a corresponding immediate decrease in the amount of external reflux being added via line 19. The net effect of this system, therefore, is to maintain the rate of internal reflux within the column at a predetermined substantially constant value.

Returning now to flow recorder controller 29, a convenient method of activating this flow control device is through differential temperature measuring device 37 which develops across two or more fractionating trays a correlatable temperature difference which is, to some extent, a measure of the amount of toluene, in the illustrative situation, which is being carried up the column by entrainment.

The components of the control system are well known to those skilled in the art. The various transmitters, square root means, multipliers and controllers are available commercially from any number of reputable instrument manufacturers.

Thus, from the description of the invention presented thus far, the inventive system embodies an internal reflux control means operating in conjunction with a fractionating column having at least two (2) internal reboiler means for the supply of heat therein, said internal reflux rate control means comprising: (a) first means to establish a first signal representing the quantity $$[R_e(1 + K\Delta T)]$$

wherein $R_e$ represents the rate of flow of fluid as determined by said second flow measurement means in said reflux inlet means, K is a constant, and $\Delta T$ is the difference in temperature of fluids in said first vapor outlet means and said reflux inlet means; (b) second means to establish a second signal representing the rate of flow of fluid as determined by said first flow measurement means in said second outlet means; (c) third means for subtracting the quantity represented by said second signal from the quantity represented by said first signal; and (d) fourth means responsive to said third means to adjust the rate of flow through said reflux inlet means.

A still further preferred embodiment of this invention includes the system hereinabove further characterized by condensing and condensate collection means associated with said first vapor outlet means and said first reflux inlet means and by control means responsive to the rate of accumulation of condensate to adjust the rate of flow of fluid through said second outlet means.

What is claimed is:
1. System for fractional distillation which comprises:
(a) an elongated vertically disposed column having a plurality of vertically spaced vapor-liquid contact means positioned internally throughout a major portion of the height of the column;
(b) first feed inlet means at a locus intermediate the ends of said column, and second feed inlet means spaced from and above said first inlet means;
(c) first vapor outlet means from the upper portion of said column, second outlet means from the side of said column at a locus spaced from and above said second feed inlet means and having first flow measurement means associated therewith, third outlet means from the side of said column at a hereinafter specified locus spaced from and below said first feed inlet means, reflux inlet means into the top portion of the column having second flow measurement means associated therewith, and a liquid bottoms outlet means from the bottom portion of the column;
(d) first heat supplying means comprising reboiler means in the lower portion of said column at a locus below said third outlet means, and second heat supplying means comprising reboiler means in the lower portion of said column at a locus spaced above said third outlet means and spaced below said first feed inlet means;
(e) first means to establish a first signal representing the quantity $[R_e(1+K\Delta T)]$ wherein $R_e$ represents the rate of flow of fluid as determined by said second flow measurement means in said reflux inlet means, K is a constant, and $\Delta T$ is the difference in temperature of fluids in said first vapor outlet means and said reflux inlet means;
(f) second means to establish a second signal representing the rate of flow of fluid as determined by said first flow measurement means in said second outlet means;
(g) third means for subtracting the quantity represented by said second signal from the quantity represented by said first signal;
(h) fourth means to establish a differential temperature signal representing temperature difference across a portion of said column intermediate said second feed inlet and said second outlet means; and,
(i) fifth means responsive to said third means and to said fourth means to adjust the rate of flow through said reflux inlet means.

2. System according to claim 1 further characterized by condensing and condensate collection means associated with said first vapor outlet means and said reflux inlet means, and by control means responsive to the rate of accumulation of condensate to adjust the rate of flow of fluid through said second outlet means.

3. System according to claim 1 wherein said first and second reboiler means are internal to said column.

References Cited
UNITED STATES PATENTS

| | | | |
|---|---|---|---|
| 837,696 | 12/1906 | Lorentz | 202—155 |
| 2,900,312 | 8/1959 | Gilmore | 202—160 |
| 2,933,900 | 4/1960 | Hanthorn | 202—160 |
| 3,020,213 | 2/1962 | Lupfer | 196—132 |
| 3,212,997 | 10/1965 | Walker | 196—132 |
| 3,331,753 | 7/1967 | Foester et al. | 196—132 |
| 3,338,799 | 8/1967 | Brandt et al. | 202—155 |
| 3,349,010 | 10/1967 | Plaster | 203—99 |
| 3,365,386 | 1/1968 | Van Pool | 196—132 |
| 3,398,087 | 8/1968 | Lieber et al. | 203—1 |
| 3,405,035 | 10/1968 | Boyd | 203—1 |

WILBUR L. BASCOMB, JR., Primary Examiner

U.S. Cl. X.R.

196—132; 202—160, 181; 203—1, 2, 99; 260—674